(12) United States Patent
Jenkins et al.

(10) Patent No.: US 10,265,933 B2
(45) Date of Patent: Apr. 23, 2019

(54) MICROLAYER COMPONENT FOR FILMS WITH IMPROVED GAS/MOISTURE CARRIER BY CONTROLLING CRYSTAL LAMELLAE ORIENTATION

(71) Applicant: Dow Global Technologies LLC, Midland, MI (US)

(72) Inventors: Steven R. Jenkins, Sanford, MI (US); Patrick Lee, Midland, MI (US); Joseph Dooley, Midland, MI (US); Donald E. Kirkpatrick, Lake Jackson, TX (US); Bernard Obi, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 417 days.

(21) Appl. No.: 14/646,425

(22) PCT Filed: Nov. 18, 2013

(86) PCT No.: PCT/US2013/070574
§ 371 (c)(1),
(2) Date: May 21, 2015

(87) PCT Pub. No.: WO2014/085127
PCT Pub. Date: Jun. 5, 2014

(65) Prior Publication Data
US 2015/0298437 A1    Oct. 22, 2015

Related U.S. Application Data

(60) Provisional application No. 61/730,651, filed on Nov. 28, 2012.

(51) Int. Cl.
| | |
|---|---|
| *B32B 27/36* | (2006.01) |
| *B32B 27/08* | (2006.01) |
| *B32B 27/30* | (2006.01) |
| *B32B 27/32* | (2006.01) |
| *B29C 47/00* | (2006.01) |
| *B29C 47/06* | (2006.01) |
| *B29C 47/78* | (2006.01) |
| *B29D 7/01* | (2006.01) |
| *B29K 23/00* | (2006.01) |

(52) U.S. Cl.
CPC .......... *B32B 27/08* (2013.01); *B29C 47/0057* (2013.01); *B29C 47/06* (2013.01); *B29C 47/78* (2013.01); *B29D 7/01* (2013.01); *B32B 27/302* (2013.01); *B32B 27/306* (2013.01); *B32B 27/308* (2013.01); *B32B 27/32* (2013.01); *B32B 27/325* (2013.01); *B32B 27/36* (2013.01); *B32B 27/365* (2013.01); *B29K 2023/18* (2013.01); *B29K 2995/0067* (2013.01); *B32B 2250/05* (2013.01); *B32B 2250/24* (2013.01); *B32B 2250/42* (2013.01); *B32B 2307/7244* (2013.01); *B32B 2307/7246* (2013.01); *B32B 2439/70* (2013.01)

(58) Field of Classification Search
CPC ..... B29C 47/0057; B29C 47/06; B29C 47/78; B29D 7/01; B29K 2023/18; B29K 2995/0067; B32B 2250/05; B32B 2250/24; B32B 2250/42; B32B 2307/7244; B32B 2307/7246; B32B 2439/70; B32B 27/08; B32B 27/03

See application file for complete search history.

(56) References Cited

U.S. PATENT DOCUMENTS

| | | | |
|---|---|---|---|
| 4,963,429 A * | 10/1990 | Norian | B82Y 25/00 428/220 |
| 8,034,878 B2 | 10/2011 | Karjala et al. | |
| 8,420,704 B2 | 4/2013 | Hillmyer et al. | |
| 2004/0241477 A1 | 12/2004 | Watanabe | |
| 2007/0084083 A1 | 4/2007 | Hazenberg et al. | |
| 2008/0254281 A1 * | 10/2008 | Chen | B29C 51/004 428/335 |
| 2008/0306217 A1 | 12/2008 | Karjala et al. | |
| 2009/0169853 A1 | 7/2009 | Chang et al. | |
| 2010/0143709 A1 | 6/2010 | Baer et al. | |
| 2010/0292077 A1 | 11/2010 | Hillmyer et al. | |
| 2011/0241245 A1 | 10/2011 | Hiltner et al. | |

OTHER PUBLICATIONS http://www.dictionary.com/browse/lamellae?s=t, 2018.*

\* cited by examiner

*Primary Examiner* — Lawrence D Ferguson
(74) *Attorney, Agent, or Firm* — Husch Blackwell LLP

(57) ABSTRACT

A microlayer component having improved oxygen and water vapor barrier properties (i.e., decreased permeabilities) comprises a barrier microlayer of a semi-crystalline barrier polymer in direct contact with a confining microlayer to promote in-plane crystalline lamellae formation. A microlayer component having a significant amount of in-plane crystalline lamellae may be characterized by at least 1.5× oxygen permeability improvement and at least 1.5× water vapor permeability improvement. A microlayer component having at least 1.5× improvement in oxygen and water vapor permeability may be coextruded and subjected to post extrusion stretching or heat treating.

10 Claims, No Drawings

MICROLAYER COMPONENT FOR FILMS WITH IMPROVED GAS/MOISTURE CARRIER BY CONTROLLING CRYSTAL LAMELLAE ORIENTATION

FIELD OF THE INVENTION

This invention relates to a microlayer component and, in particular, to a method for forming a microlayer component for films having decreased gas and moisture permeability and a film product comprising the microlayer component.

BACKGROUND OF THE INVENTION

There are many applications where films having improved gas and moisture barrier properties would be beneficial. For example, there is continued interest in the development of food and beverage packaging material with enhanced gas and moisture barrier properties to reduce the amount of food waste.

Crystallization, specifically controlled crystallization, is one method known in the art to reduce the gas and moisture permeability of films. Known coextrusion methods exist to create a multilayered film and film components to decrease gas permeability. However, there is continued interest in developing coextrusion products having increased oxygen barrier properties as well as moisture barrier properties.

SUMMARY OF THE INVENTION

The present disclosure provides a microlayer component comprising at least one barrier microlayer of a first polymer material (the barrier polymer) which is semi-crystalline and has opposing facial surfaces, wherein at least one facial surface is in direct contact with at least one confining microlayer of a second polymer material (the confining polymer). The microlayer component is characterized by crystalline lamellae in the barrier microlayers, the lamellae substantially parallel with the barrier and confining microlayers.

The present disclosure provides a method of producing a microlayer component having at least about 1.5× oxygen and water vapor permeability improvement (i.e., decreased permeability) compared to a barrier monolayer film, the method comprising the steps of (i) coextruding at least two polymer materials to produce a microlayer component, one polymer material being a barrier polymer material and the second polymer material being a confining polymer material, wherein at least one microlayer made from the barrier polymer material has at least one facial surface in direct contact with a microlayer of the confining polymer material, and (ii) treating the microlayer component with heat or stretching.

In an embodiment, significant in-plane crystalline lamellae may be characterized by an effective oxygen permeability improvement of at least about 1.5× and an effective water vapor permeability improvement of at least about 1.5× over a barrier monolayer film.

In an embodiment the present invention comprises a plurality of barrier microlayers having opposing facial surfaces, each facial surface in direct contact with a confining microlayer.

In an embodiment, the barrier polymer is preferably poly(1-butene), poly(1-butene) copolymer, polypropylene, polypropylene copolymer, polyethylene terephthalate (PET), polyester based polymers and combinations thereof.

In an embodiment, the barrier polymer is preferably poly(1-butene) (PB-1).

In an embodiment, the confining polymer comprises cyclo-olefin polymer (COP), polypropylene (PP), polypropylene copolymers, polycarbonate (PC), polystyrene (PS), ethylene acrylic acid (EAA), ethylene vinyl alcohol polymer (EVOH), poly(methyl methacrylate) (PMMA), styrene-acrylonitrile resin (SAN) and combinations thereof.

In an embodiment, the confining polymer is preferably COP, EAA, EVOH, PP, PP copolymers and combinations thereof.

In an embodiment the present invention is microlayer component having increased oxygen and water vapor barrier properties comprising at least one barrier microlayer including a barrier polymer material in direct contact with at least one confining microlayer including a confining polymer material.

In an embodiment, the microlayer component may show at least about 1.5×, preferably at least about 1.6×, and more preferably at least about 2.0× and most preferably at least about 5.0× barrier improvement in at least one of oxygen permeability and moisture permeability when compared to a barrier monolayer film. Preferably, the microlayer component may show at least about 1.5×, preferably at least about 1.6×, and more preferably at least about 2.0×, and most preferably at least about 5.0× barrier improvement in both oxygen permeability and moisture permeability when compared to a barrier monolayer film.

In an embodiment the microlayer component of the present invention may have multiple barrier and confining microlayers and have a total thickness of at least about 0.001 mm and at most about 15 mm.

In an embodiment, the nominal single microlayer thickness of a barrier microlayer may be at least about 10 nm, preferably at least about 15 nm and most preferably at least about 20 nm and at most about 500 nm, preferably at most about 300 nm and most preferably at most about 150 nm.

The present disclosure provides a process for post-extrusion treatment of a microlayer component having increased oxygen and water vapor barrier properties. In an embodiment, the microlayer component is subjected to at least one of (i) heating to a temperature above the melting temperature of the barrier polymer material, cooling to an isothermal temperature between the melting temperature and the onset of crystallization temperature and holding at the isothermal temperature until the barrier polymer reaches at least about 50% of its final crystallinity; (ii) uniaxially or biaxially stretching; and (iii) combinations thereof.

The present disclosure provides for a film product comprising the microlayer component described and additional layers or microlayers, wherein the film may be manufactured into food packaging, blister packaging, lids, medical IV bags and other articles.

DETAILED DESCRIPTION OF THE PREFERRED EMBODIMENT

Definitions

Unless stated to the contrary, implicit from the context, or customary in the art, all parts and percents are based on volume and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, temperature, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, viscosity, temperature and the relative amounts of the individual components in the composition.

The term "barrier microlayer" means a microlayer of semi-crystalline polymer or polymer composition which is resistant to gas and moisture permeation. A polymer suitable for use as a barrier microlayer may have a limited number of nucleation sites from both the interface of the barrier microlayer with a confining polymer and within the barrier microlayer and not demonstrate transcrystallinity.

The term "barrier monolayer film" means a monolayer film comprising only barrier Polymer to which a multilayer film comprising barrier and confining polymers is compared to determine permeability improvement.

"Blend," "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Composition", "formulation" and like terms means a mixture or blend of two or more components.

"Comprising", "including", "having" and like terms mean that the composition, process, etc. is not limited to the components, steps, etc. disclosed, but rather can include other, undisclosed components, steps, etc. In contrast, the term "consisting essentially of" excludes from the scope of any composition, process, etc. any other component, step etc. excepting those that are not essential to the performance, operability or the like of the composition, process, etc. The term "consisting of" excludes from a composition, process, etc., any component, step, etc. not specifically disclosed. The term "or", unless stated otherwise, refers to the disclosed members individually as well as in any combination.

The term "confining layer" means a layer of polymer or polymer composition wherein the polymer or polymer composition may not extensively nucleate crystallization of a barrier microlayer.

The term "facial surface" means a surface parallel with film layering.

The term "in-plane" refers to alignment parallel with the layering of a multilayer product, such as a film. When used in reference to the formation of lamellae, "in-plane" formation means the lamellae form parallel, or in the plane of, film layers.

The term "onset of crystallization" means an extrapolated onset by differential scanning calorimetry (DSC) cooling at 10° C. per minute.

The terms "microlayer" and "nanolayer" refer to a single layer within a microlayer component. A microlayer or nanolayer may be at most 500 nm thick.

The term "polymer" refers to a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term "semi-crystalline" refers to a polymer which solidifies by crystallization and includes polymers which approach 100% crystalline upon crystallization. Preferably, a semi-crystalline polymer will have at least about 10% crystallinity on a mass basis, and more preferably at least about 20%, and most preferably at least about 30%. A semi-crystalline polymer may also crystallize in lamellae form such that the thickness of the crystals is small relative to their other dimensions. Semi-crystalline polymers as defined herein do not include polymers that crystallize in fibril or fringed micellar type morphologies.

Multilayer Film

In an embodiment, the present invention is a microlayer component with improved gas/moisture barrier properties when compared to a barrier monolayer film. The microlayer component includes at least one barrier microlayer in direct contact with at least one confining microlayer. In an embodiment, the microlayer component has at least about 1.5× calculated barrier improvement using the equation below, more preferably at least about 1.6× improvement, and most preferably at least about 2.0× improvement, over the calculated monolayer barrier permeability:

$$P_B = V_B \left( \frac{1}{P} - \frac{1 - V_B}{P_C} \right)^{-1}$$

wherein P is the permeability of the microlayer component, $V_B$ and $V_C$ are the volume fraction of the barrier and confining polymers, respectively, and $P_B$ and $P_C$ are the permeability of the barrier and confining polymers, respectively.

In an embodiment, the microlayer component may show at least about 1.5×, preferably at least about 1.6×, more preferably at least about 2.0× and most preferably at least about 5.0× barrier improvement (i.e., decrease in permeability) in at least one of oxygen permeability and moisture permeability when compared to a barrier monolayer film.

Preferably, the microlayer component may show at least about 1.5×, preferably at least about 1.6×, more preferably at least about 2.0× and most preferably at least about 5.0× barrier improvement in both oxygen permeability and moisture permeability when compared to a barrier monolayer film.

In some embodiments, a microlayer component of the present invention has an effective oxygen permeability of less than about 350 cc mil/100 in$^2$/day, preferably less than about 200 cc mil/100 in$^2$/day, more preferably less than about 100 cc mil/100 in$^2$/day and most preferably less than about 50 cc mil/100 in$^2$/day. In an embodiment, a microlayer component of the present invention has an effective water vapor permeability of less than about 0.75 g mil/100 in$^2$/day, preferably less than about 0.5 g mil/100 in$^2$/day, more preferably less than about 0.2 g mil/100 in$^2$/day, and most preferably less than about 0.08 g mil/100 in$^2$/day.

The at least one barrier microlayer of the present microlayer component may be any polymer material (barrier polymer) which is semi-crystalline. Some non-limiting examples of polymer materials which may be used for a barrier microlayer in the present invention include poly(1-butene), poly(1-butene) copolymer, polypropylene, polypropylene copolymer, polyethylene terephthalate, polyester based polymers, and combinations and compositions of these and other polymers.

In an embodiment, the polymer material of the barrier microlayer is preferably poly(1-butene) (PB-1).

The at least one confining layer of the present microlayer component may be any polymer or polymer composition wherein the polymers solidify at a temperature higher than that at which the polymers of a barrier microlayer crystalize. Some non-limiting examples of polymer materials which may be used for a confining microlayer include cyclo-olefin polymers (COP), polypropylene, polypropylene copolymers, polystyrene (PS), ethylene acrylic acid (EAA), ethylene vinyl alcohol polymer (EVOH), poly(methyl methacrylate) (PMMA), styrene-acrylonitrile resin (SAN), polycarbonate (PC) and combinations thereof.

Preferably, the confining polymer is COP, EAA, EVOH, PP, PP copolymers and combinations thereof. In some embodiments, confining polymers may also exhibit barrier properties, such as EVOH which may be used as a confining layer decrease the oxygen permeability of a microlayer component.

In some embodiments, upon cooling, the solidification temperature of the confining polymer may preferably be higher than the crystallization temperature of the barrier polymer. In other embodiments, the melting or glass transition temperature of the confining polymer may preferably be higher than the melting temperature of the barrier polymer.

In an embodiment, the polymer material of the confining microlayer is preferably COP.

The polymer material used for the barrier microlayer and confining microlayer are chosen to promote the formation of crystalline lamellae upon confining of the barrier microlayer with the confining microlayer. The formation of crystalline lamellae aligned parallel with the microlayers increases the barrier properties of the microlayer component.

A polymer may have properties enabling it to be both a confining microlayer and a barrier microlayer depending on the other polymers used. However, a barrier polymer may not act as its own confining polymer.

In an embodiment, the present invention is a microlayer component having a plurality of alternating barrier and confining microlayers. Preferably a microlayer component of the present invention will have at most about 3,000 and at least about 15 microlayers.

In an embodiment, the microlayer component of the present invention has at most about 90 percent by volume (vol %) of confining polymer based on the total combined volume of barrier and confining polymer. In other embodiments, the confining polymer may be at most about 85 vol %, and preferably at most about 70 vol %. In other embodiments, the confining polymer may be at least about 10 vol %, preferably at least about 20 vol %, and most preferably at least about 30 vol %.

In an embodiment, the microlayer component of the present invention has at most about 90 vol % of a barrier polymer based on the total combined volume of barrier and confining polymer, preferably at most about 80 vol %, and most preferably at most about 75 vol %. A microlayer component of the present invention may have at least about 10 vol % of a barrier polymer, and preferably at least 15 about vol %.

In an embodiment the microlayer component of the present invention may have multiple barrier and confining microlayers and have a total thickness of at least about 0.001 mm and at most about 15 mm. More preferably, the microlayer component has a total thickness of at most about 10 mm and most preferably at most about 5 mm.

In an embodiment, the nominal single microlayer thickness of a barrier microlayer, as calculated from the total number of microlayers, composition ratio and total microlayer component thickness, may be at least about 10 nm, at least about 15 nm or at least about 20 nm and at most about 500 nm, at most about 300 nm or at most about 150 nm. The nominal microlayer thickness of a barrier microlayer is directly related to the barrier properties of the microlayers. As the thickness of a barrier microlayer increases, fewer in-plane crystalline lamellae form, resulting in a decrease in barrier properties. The exact nominal thickness of a barrier microlayer will depend on the desired extent of in-plane lamellae formation desired and may vary based on the polymer material of the barrier microlayer.

The nominal thickness of a confining microlayer does not alter the barrier properties of or development of crystalline lamellae in a barrier microlayer. Therefore, the nominal microlayer thickness of a confining microlayer may be greater than, less than or equal to the nominal thickness of a barrier microlayer. The nominal thickness of the confining microlayer may be selected based on desired characteristics of the final microlayer component or a resulting film product, such as cost, overall thickness, presence of additional other layers/microlayers or materials, and combinations of these factors.

In some embodiments having multiple barrier microlayers and multiple confining microlayers, the exact thickness of each of the barrier microlayers and confining microlayers may vary slightly within the microlayer component.

In an embodiment, the present invention is a microlayer component having at least one barrier microlayer confined between at least two confining microlayers and having a significant amount of in-plane crystalline lamellae present in the barrier microlayer. The proportion of in-plane crystalline lamellae present in a barrier microlayer may be reflected as a resulting increase in barrier effectiveness (i.e., decrease in oxygen or water vapor permeability) for an overall microlayer component or resulting film product.

A microlayer component having a significant amount of in-plane crystalline lamellae may be characterized by at least about 1.5× oxygen permeability improvement or about 1.5× water vapor permeability improvement. A significant amount of in-plane crystalline lamellae may be characterized by at least about 1.5× permeability improvement for either or both oxygen and water permeability.

In an embodiment, a microlayer component of the present invention has an effective oxygen permeability of less than about 350 cc mol/100 in$^2$/day, preferably less than about 200 cc mol/100 in$^2$/day, more preferably less than about 100 cc mol/100 in$^2$/day and most preferably less than about 50 cc mol/100 in$^2$/day. In an embodiment, a microlayer component of the present invention has an effective water vapor permeability of less than about 0.75 g mil/100 in$^2$/day, preferably less than about 0.5 g mil/100 in$^2$/day, more preferably less than about 0.2 g mil/100 in$^2$/day, and most preferably less than about 0.08 g mil/100 in$^2$/day.

In an embodiment, a microlayer component of the present invention may include additional microlayers or layers other than at least one barrier microlayer and at least one confining microlayer. Non-limiting examples of additional microlayers or layers which may be provided in a microlayer component include skin layers, tie layers, EVOH layers, sealant layers, adhesive layers, foil layers, print layers, lamination layers, PET layers, other polymer layers and other additional barrier and/or confining microlayers/layers. Additional layers such as these are known in the art and may be used to provide strength, additional barrier properties, aesthetic qualities, durability or other desirable characteristic to a microlayer component or resulting film product.

In an embodiment, the present invention is a microlayer component comprising a plurality of barrier microlayers confined between a plurality of confining microlayers, and further including at least one microlayer of ethylene vinyl alcohol (EVOH). In some embodiments, EVOH may act as a confining microlayer or replace one or more confining microlayers in a multilayer film.

In the present microlayer component, a microlayer of barrier polymer acting as a barrier microlayer must be directly adjacent to and in physical contact with a microlayer of confining polymer. However, it is not necessary that a barrier microlayer be flanked on both facial surfaces by a confining microlayer. When additional microlayers or layers, such as those listed above, are present in a microlayer component or resulting film product according to the present invention, those microlayers/layers may be anywhere within the microlayer component or resulting film product as long as microlayers comprised of barrier polymer material intended to act as a barrier microlayer and increase barrier properties are in direct contact with at least one confining microlayer.

Coextrusion Process

In an embodiment, the microlayer component of the present invention may be prepared by microlayer coextrusion. Microlayers or nanolayers are comprised of alternating layers of confining polymer material and barrier polymer material, and any additional material for other desired microlayers/layers. Individual microlayer thicknesses may range from the microscale to the nanoscale, and the thickness of individual microlayers may vary.

When a microlayer component of the present invention is prepared by coextrusion, the temperatures of the extruders, multiplier elements and dies must be specifically set to ensure a uniform film. In some embodiments, the barrier and confining polymers are chosen having process temperatures such that layer break-up of the barrier polymer is limited and there are no major flow instabilities when the polymer pair is processed into a microlayer.

For a microlayer component of the present invention comprising only a single barrier microlayer confined between two confining microlayers, a typical coextrusion system may consist of two ¾ inch single screw extruders, each connected by a melt pump to a coextrusion feedblock. The feedblock may combine the polymer material of the confining microlayer and the barrier microlayer in an ABA configuration, where A is the confining polymer material and B is the barrier polymer material. The melt pumps control the two melt streams that are combined in the feedblock as two parallel layers. By adjusting the melt pump speed, the relative layer thickness, and the ratio of A to B, can be adjusted.

In further embodiments, additional confining and barrier microlayers may be desired, and the number of extruders may be adjusted accordingly.

From the feedblock, the melt goes through a series of multiplying elements. It is understood by those skilled in the art that the number of extruders used to fabricate a microlayer component of this invention equals the number of different layers. Thus, a microlayer component having layers of three different materials (for example, A, B and C) requires three extruders.

Heat Treatment

In an embodiment, the present invention is a heat-treated microlayer component having alternating confining and barrier microlayers. The microlayer component may be heated to a temperature above the melting temperature of the barrier polymer material, cooled to an isothermal temperature between the melting temperature and the onset of crystallization temperature, and held at that isothermal temperature until the barrier polymer reaches at least about 50% of its final crystallinity.

The exact heating temperature may depend on the specific confining and barrier polymers used, as well as the presence of any additional microlayers/layers. Similarly, the exact heating time may depend on the specific confining and barrier polymers used, as well as the heating temperature. In some embodiments, the heating time may range from one second to two hours In an embodiment, the microlayer component may be heated to a temperature of about 100° C. to 150° C. for at least about 5 minutes and at most about 90 minutes. The microlayer component may be heated in an oil bath or in a convection oven.

For a microlayer component having a barrier microlayer comprising PB-1, the microlayer component may be heated to preferably about 130° C. When heated using an oil bath, a microlayer component having a barrier microlayer of PB-1 may be thermally treated at 130° C. for 5 minutes. When using a convection oven, a microlayer component having a barrier microlayer of PB-1 may be thermally treated at 130° C. for 60 minutes.

After heating, the microlayer component is cooled in a controlled manner to control the recrystallization of the barrier microlayer. In an embodiment, the microlayer component is cooled at a slow rate to an isothermal temperature at or below the onset of crystallization temperature of the barrier microlayer. The exact temperature to which a microlayer component is cooled depends on the specific barrier and confining polymers used. Similarly, the cooling rate may depend on the specific barrier and confining polymers, as well as the final temperature to be reached.

The microlayer component is held at that isothermal temperature until the barrier polymer reaches at least about 50% of its final cyrstallinity.

In an embodiment, the microlayer component may be cooled to about 60° C. to 90° C., and preferably about 70° C. to 85° C. In some embodiments, the cooling rate may be no greater than about 1° C./min, or no greater than 0.5° C./min, or no greater than 0.3° C./min. In other embodiments, the cooling rate may be significantly faster and almost instantaneous. The cooler temperature may then be maintained for at least 16 hours to allow recrystallization.

For a microlayer component having a barrier microlayer comprising PB-1, the microlayer component may be cooled to about 70° C. at a rate of about 0.5° C./min after treatment in an oil bath at 130° C. for 5 minutes. For a microlayer component having a barrier microlayer comprising PB-1, the microlayer component may be cooled to about 85° C. at a rate of about 0.3° C./min after treatment in a convection oven at about 130° C. for about 60 minutes.

In an embodiment, a microlayer component may be uniaxially or biaxially stretched. A microlayer component may be stretched after extrusion with no following heat treatment, may be stretched and then heat treated, or may be heat treated and then stretched.

Film Products

In an embodiment, a microlayer component of the present invention may be incorporated as a one or more layers in a larger layered film product.

For example, a microlayer component of the present invention may be used to replace a foil or lamination layer in a packaging film, or to replace existing polyvinyl chloride/polyvinylidene chloride (PVC/PVDC) and PVC/ACLAR systems in blister packaging. A microlayer component of the present invention may also wholly replace chlorine polymer. A microlayer component of the present invention may also replace high-density polyethylene (HDPE)/sealant systems in cereal packaging to increase shelf life.

A microlayer component of the present invention may also be used to replace PVDC-coated bi-axially oriented polypropylene (BOPP) and bi-axially oriented polyethylene terephthalate (BOPET) used for lidding and snack packaging.

However, in other embodiments, the microlayer component itself may be used as a film product.

In an embodiment, a microlayer component the present invention or film product incorporating the microlayer component is formed into an article, such as packaging, blister packaging, lids, or medical IV bags.

SPECIFIC EMBODIMENTS

Materials

PB-1 (PB 8640M, random copolymer of butene-1 with low ethylene content, MFI=1 g/10 min at 190° C./2.16 kg) was obtained from Lyondellbasell.

Zeonex 690 R (COP, MFI=17 g/10 min at 280° C./2.16 kg) was obtained from Zeon Chemicals L.P.

HP030 (COP, MFI=11 g/10 min at 300° C./1.2 kg) was obtained from The Dow Chemical Company.

Polypropylene (PP, H314-02Z, MFI=2 g/10 min at 190° C./2.16 kg) was obtained from The Dow Chemical Company.

Polycarbonate (PC, Caliber 201-15) was obtained from The Dow Chemical Company.

To ensure polymer material rheological compatibility for coextrusion and maximize layer uniformity and overall film quality, a viscosity-match temperature for coextrusion was determined for PB-1, COP, PP and PC. Polymer melt viscosity was determined as a function of temperature using a Kayeness Galaxy 1 melt flow indexer (MFI) at a low shear rate, 10 s$^{-1}$. This low shear rate was selected to simulate polymer flow conditions in the layer multiplying dies of the polymer melt streams during the layer multiplication process. Coextrusion temperatures of 260° C. and 240° C. were selected for PB-1/COP and PB-1/PC, respectively.

Films with alternating PB-1 and COP or PC layers were fabricated using a forced assembly layer-multiplying coextrusion process. The extruders, multiplier elements and die temperatures were set at 240° C. and 260° C., as detailed above, to ensure matching viscosities of the two polymer melts during processing. The films were collected on a heated cast-film takeoff roll set at a temperature of 60° C.

Microlayer components with 257 or 1024 alternating PB-1 and COP or PC layers were coextruded. The composition was fixed by fixing the relative pump rates of each polymeric material. The nominal microlayer thickness, calculated from the number of layers, the composition ratio, and film thickness, varied from 80 to 120 nanometers. Table 1 lists the materials, number of layers and nominal layer thickness for each inventive example.

TABLE 1

EXAMPLE MICROLAYER COMPONENTS AND LAYER THICKNESS

| Sample No. | E1 | E2 | E3 | E4 | E5 | E6 |
|---|---|---|---|---|---|---|
| PB-1 (vol %) | 30 | 40 | 40 | 50 | 30 | 30 |
| HP030 (COP) (vol %) | — | — | — | — | 70 | 70 |
| Zeonex (COP) (vol %) | 70 | 60 | — | — | — | — |
| PC (vol %) | — | — | 60 | 50 | — | — |
| Number of Layers | 257 | 1024 | 1024 | 1024 | 257 | 257 |
| Nominal PB-1 Layer Thickness (nm) | 120 | 80 | 80 | 100 | 120 | 120 |

Control PB-1, COP and PC films were extruded through the layer multipliers under identical processing conditions as the PB-1/COP and PB-1/PC films.

Coextruded film samples were post-extrusion thermally treated at 130° C. for 5 minutes in an oil bath and then cooled to 70° C. at a rate of 0.5° C./min and then maintained at the temperature for 16 hours for re-crystallization. In some cases, coextruded film samples were post-extrusion thermally treated at 130° C. for 1 hour in a convection oven, then cool to 85° C. at a rate of 0.3° C./min and maintained at the temperature for 16 hours for re-crystallization.

Testing Methodology 2D wide-angle X-ray scattering (2D WAXS) measurements were carried out using Micromax 002+ X-ray generator operated at 45 kV and 0.88 mA producing a highly focused parallel beam of monochromatic CuKa radiation (wavelength=0.154 nm). 2D WAXS patterns were collected on a magnetic imaging plate by aligning the incident X-ray beam parallel to the extrusion (ED) of the films. Imaging plates were processed using a Fujifilm PLA700 image reader after 3 hours of exposure. The collimated X-ray beam size used was 0.3 mm, the sample-to-detector distance was 150 mm, and the diffraction angle was calibrated using CaF$_2$ standard. The effective permeability of the barrier microlayer ($P_B$) was calculated using the following equation:

$$P_B = V_B \left( \frac{1}{P} - \frac{1-V_B}{P_C} \right)^{-1}$$

where $V_B$ is the volume fraction of barrier microlayer, P is the film permeability, and $P_c$ is the permeability of the confining polymer, which is assumed to be independent of the microlayer thickness.

The effective permeability of oxygen and the effective permeability of water vapor were used to determine the effectiveness of the barrier microlayers. The effective permeability of oxygen and the effective permeability of water vapor were both calculated according to the equation above, using the permeability values of the film and confining layer for oxygen and water vapor, as appropriate.

Results

A microlayer component of PB-1/COP was analyzed using 2D WAXS. The 2D WAXS images of the PB-1/COP microlayer component showed polymer chains oriented perpendicular to the microlayer component, meaning the crystalline lamellae were oriented parallel with the microlayers of the films. A microlayer component of PB-1/PP was also generated according to the above procedure to determine polymer chain orientation. 2D WAXS images of the PB-1/PP microlayer component also showed in-plane lamellae.

When analyzing the oxygen permeability for as coextruded and post-extrusion thermally treated PB-1/COP microlayer component, both the as coextruded microlayer component and the thermally treated microlayer component showed permeability improvement over a comparative monolayer of barrier polymer. However, with post extrusion heat treatment, the PB-1 $P_B$ for oxygen was approximately 21 times lower (21 time improved) than the comparative example a PB-1 monolayer with an equivalent nominal PB-1 layer thickness (reduced from 394 to about 19 cc-mil/100 in$^2$/day).

Table 2 compares the $P_B$ of oxygen in different PB-1-containing films.

TABLE 2

EFFECTIVE OXYGEN PERMEABILITY
OF PB-1 MICROLAYER COMPONENTS

| Sample | Number of Layers | Nominal PB-1 Layer Thickness (nm) | $P_B$ Oxygen @ 50% Relative Humidity (cc mil/100 in$^2$/day) |
|---|---|---|---|
| PB-1 monolayer* | 1 | 50800 | 394 |
| E3, as extruded | 1024 | 80 | 211 |
| E6, as extruded | 257 | 120 | 169 |
| E7, as extruded | 257 | 240 | 180 |
| E1, heat treated (70° C.) | 257 | 120 | 19 |
| E3, heat treated (70° C.) | 1024 | 80 | 14 |
| E4, heat treated (70° C.) | 1024 | 80 | 39 |
| E5, heat treated (70° C.) | 1024 | 100 | 66 |
| E6, heat treated (70° C.) | 257 | 120 | 19 |
| E1, heat treated (70° C.) | 257 | 240 | 24 |
| E3, heat treated (85° C.) | 1024 | 80 | 3.4 |

*Comparative example

The effective permeability of water vapor was also calculated, and it was surprising that as coextruded PB-1 containing microlayer component averaged a water vapor permeability improvement of three times that of a comparative PB-1 only monolayer film. With heat treatment, the improvement was approximately 20 times compared to the $P_B$ of the comparative PB-1 only film (from 0.8 to 0.04 g mil/100 in$^2$/day).

Table 3 compares the $P_B$ of water vapor of different films.

TABLE 3

EFFECTIVE WATER VAPOR PERMEABILITY
OF PB-1 MICROLAYER COMPONENTS

| Sample | Number of Layers | Nominal PB-1 Layer Thickness (nm) | $P_B$ Water Vapor @ 100% Relative Humidity (g mil/100 in$^2$/day) |
|---|---|---|---|
| PB-1 monolayer* | 1 | 50800 | 0.81 |
| E1, as extruded | 257 | 120 | 0.32 |
| E3, as extruded | 1024 | 80 | 0.51 |
| E6, as extruded | 257 | 120 | 0.27 |
| E7, as extruded | 257 | 240 | 0.37 |
| E1, heat treated (70° C.) | 257 | 120 | 0.063 |
| E3, heat treated (70° C.) | 1024 | 80 | 0.049 |
| E4, heat treated (70° C.) | 1024 | 80 | 0.16 |
| E5, heat treated (70° C.) | 1024 | 100 | 0.31 |
| E6, heat treated (70° C.) | 257 | 120 | 0.055 |
| E7, heat treated (70° C.) | 257 | 240 | 0.067 |
| E3, heat treated (85° C.) | 1024 | 80 | 0.016 |

*Comparative example

For oxygen permeability, the as extruded example (E3) showed 1.9× improvement (from 394 to 211 cc mil/100 in$^2$/day). With post extrusion heat treatment, the reduction in permeability was approximately 28 times improved with a heat treatment of 70° C. (from 394 to 14 cc mil/100 in$^2$/day) and over 100 times improved with a heat treatment of 85° C. (from 394 to 3.4 cc mol/100 in$^2$/day).

For water vapor permeability, the as extruded example (E3) showed 1.6× improvement (from 0.81 to 0.51 g mil/100 in$^2$/day). With post extrusion heat treatment, the microlayer components exhibited significant greater water vapor permeability improvement. The reduction in permeability was approximately 16× improved with heat treatment at 70° C. (from 0.81 to 0.049 g mil/100 in$^2$/day) and approximately 50× at 85° C. (from 0.81 to 0.016 g mil/100 in$^2$/day).

Microlayer component having thinner PB-1 layers show increased oxygen and water vapor permeability improvements over comparative examples of PB-1 monolayers of equivalent nominal layer thickness. Thinner microlayers promote increased in-plane lamellae formation, resulting in greater barrier improvements without heat treating.

Not to be bound by any particular theory, it is believed that barrier improvement is related to an increase in tortuous path length (lamellae orientation) because similar improvements were seen for the permeability of both oxygen and water vapor.

The effective oxygen and water vapor permeabilities were also determined for PB-1/PC microlayer components having different nominal PB-1 layer thicknesses. There was less significant change in barrier properties between the as extruded microlayer components and the post-extrusion heat treated microlayer components for PB-1/PC microlayer components. There was also less significant change in barrier properties between microlayer components having different nominal PB-1 microlayer thickness. Although not as effective as Zeonex-containing PB-1 microlayer components, multilayer PB-1 microlayer components having PC as the confining polymer exhibited 10× improvement in oxygen permeability and 4× improvement in water vapor permeability after heat treatment.

The biggest improvement in barrier properties was seen with PB-1/Zeonex microlayer components, showing that it is the confining polymer, and specifically the interaction between the confining microlayer and the PB-1 microlayer, which affects the barrier properties of film most significantly.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A microlayer component comprised of:
   at least one barrier microlayer having a thickness from 80 nm to 120 nm, the barrier microlayer of a first polymer material (barrier polymer) consisting of poly(1-butene), poly(1-butene) copolymer and combinations thereof, each barrier microlayer having opposing facial surfaces, wherein at least one facial surface is in direct contact with at least one confining microlayer of a second polymer material (confining polymer),
   the barrier polymer being semi-crystalline, and
   the barrier microlayer consisting of crystalline lamellae parallel with the barrier and confining microlayers.

2. The microlayer component of claim 1, wherein the barrier polymer consists of poly(1-butene).

3. The microlayer component of claim 1, wherein the confining polymer is selected from the group consisting of cyclo-olefin polymer (COP), polypropylene (PP), PP copolymers, and polycarbonate (PC).

4. The microlayer component of claim 1 having between about 90 and 10 volume percent (vol %) confining layer polymer material based on the total volume of the confining and barrier polymer material.

5. The microlayer component of claim 1 having a total thickness between about 0.001 mm and about 15 mm.

6. The microlayer component of claim 1 having an effective oxygen permeability improvement of at least about 1.5× over a barrier monolayer film and an effective water vapor permeability improvement of at least about 1.5× over the barrier monolayer film.

7. The microlayer component of claim 1 having an effective oxygen permeability improvement of at least about 5× over a barrier monolayer film.

8. The microlayer component of claim 1 having an effective water vapor permeability improvement of at least about 5× over a barrier monolayer film.

9. The microlayer component of claim 1 including at least one other microlayer or layer selected from the group consisting of skin layers, tie layers, EVOH layers, sealant layers, adhesive layers, foil layers, print layers, lamination layers, PET layers, other polymer layers, additional barrier layers, additional confining layers and combinations thereof.

10. The microlayer component of claim 1 which is heated above the melting temperature of the barrier polymer material and cooled to an isothermal temperature between the melting temperature and the onset of crystallization temperature and held at the isothermal temperature until the barrier polymer reaches at least about 50% of its final crystallinity.

* * * * *